(12) United States Patent
Muramatsu et al.

(10) Patent No.: US 10,086,815 B2
(45) Date of Patent: Oct. 2, 2018

(54) ELECTRIC BRAKE DEVICE

(71) Applicant: NTN CORPORATION, Osaka (JP)

(72) Inventors: Makoto Muramatsu, Iwata (JP); Yuuki Saoyama, Iwata (JP); Tatsuya Yamasaki, Iwata (JP); Masaaki Eguchi, Iwata (JP); Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 130 days.

(21) Appl. No.: 15/182,211

(22) Filed: Jun. 14, 2016

(65) Prior Publication Data

US 2016/0288778 A1 Oct. 6, 2016

Related U.S. Application Data

(63) Continuation of application No. 14/237,465, filed as application No. PCT/JP2012/070096 on Aug. 7, 2012.

(30) Foreign Application Priority Data

Aug. 18, 2011 (JP) .................................. 2011-178834
Aug. 31, 2011 (JP) .................................. 2011-188699

(51) Int. Cl.
 *B60T 13/74* (2006.01)
 *B60T 17/22* (2006.01)
 (Continued)

(52) U.S. Cl.
 CPC .......... *B60T 17/221* (2013.01); *B60T 13/741* (2013.01); *B60T 13/746* (2013.01); *B60T 17/00* (2013.01);
 (Continued)

(58) Field of Classification Search
 CPC ...... B60T 13/714; B60T 13/746; B60T 17/00; B60T 17/221; F16D 2121/24;
 (Continued)

(56) References Cited

U.S. PATENT DOCUMENTS 6,315,092 B1  11/2001  Schwarz
7,140,697 B2  11/2006  Koga et al.
(Continued)

FOREIGN PATENT DOCUMENTS

CN       101663186 A       3/2010
DE  10 2005 050 740 A1    4/2007
(Continued)

OTHER PUBLICATIONS

Japanese Office Action dated Mar. 7, 2017 from Japanese Patent Application No. 2015-207809, 2 pages.
(Continued)

*Primary Examiner* — Xuan Lan T Nguyen (57) ABSTRACT

An electric brake device includes an electric motor; a braking force application mechanism configured to apply a braking force on a vehicle wheel; a lock mechanism configured to assume one of a locked condition; a temperature sensor configured to measure an ambient temperature of a vehicle; and a freezing preventive power supply unit configured to initiate supply of an electric power to the electric motor or a drive source of the lock mechanism. The freezing preventive power supply unit interrupts the supply of the electric power to the electric motor or the drive source of the lock mechanism when the temperature detected by the temperature sensor exceeds a second preset temperature T2 that is higher than a first preset temperature T1.

6 Claims, 8 Drawing Sheets

(51) Int. Cl.
  B60T 17/00 (2006.01)
  F16D 55/227 (2006.01)
  F16D 65/18 (2006.01)
  F16D 66/00 (2006.01)
  F16D 125/40 (2012.01)
  F16D 125/48 (2012.01)
  F16D 125/50 (2012.01)
  F16D 127/06 (2012.01)
  F16D 55/225 (2006.01)
  F16D 121/24 (2012.01)

(52) U.S. Cl.
  CPC ........... F16D 55/227 (2013.01); F16D 65/18 (2013.01); F16D 66/00 (2013.01); *F16D 55/225* (2013.01); *F16D 2066/001* (2013.01); *F16D 2121/24* (2013.01); *F16D 2125/40* (2013.01); *F16D 2125/48* (2013.01); *F16D 2125/50* (2013.01); *F16D 2127/06* (2013.01)

(58) Field of Classification Search
  CPC ...... F16D 2121/06; F16D 7/042; F16D 7/045; F16D 55/227; F16D 65/18; F16D 2127/06; F16D 2066/001; F16D 2125/40; F16D 2125/48; F16D 2125/50
  See application file for complete search history.

(56) References Cited

U.S. PATENT DOCUMENTS

2004/0040799 A1   3/2004   Schumann et al.
2004/0113486 A1   6/2004   Koga et al.

FOREIGN PATENT DOCUMENTS

| DE | 10 2007 014 345 A1 | 10/2008 |
|---|---|---|
| JP | 59-65868 | 5/1984 |
| JP | 62-265494 | 11/1987 |
| JP | 7-223524 | 8/1995 |
| JP | 11-153098 | 6/1999 |
| JP | 2001-524647 | 12/2001 |
| JP | 2005-82035 | 3/2002 |
| JP | 2002-317839 | 10/2002 |
| JP | 2004-10041 | 1/2004 |
| JP | 2004-175203 | 6/2004 |
| JP | 2005-22464 | 1/2005 |
| JP | 2010-241271 | 10/2010 |

OTHER PUBLICATIONS

Chinese Office Action dated May 24, 2016 from Chinese Patent Application No. 201280039757.0, 6 pages.
Japanese Office Action dated Jul. 5, 2016 from Japanese Patent application No. 2015-207809, 4 pages.
Chinese Decision of Re-examination dated Oct. 10, 2017 in related Chinese Application No. 201280039757.
Extended European Search Report dated Mar. 30, 2016 in corresponding European Patent Application No. 12824172.6.
Japanese Office Action dated Feb. 23, 2016 in related Japanese Application No. 2015-034903.
Chinese Office Action dated Jan. 13, 2016 in related Chinese Application No. 201280039757.0.
Chinese Office Action dated Jun. 24, 2015 in corresponding Chinese Patent Application No. 201280039757.0.
Japanese Notification of Reason(s) for Rejection dated Apr. 28, 2015 in corresponding Japanese Patent Application No. 2011-188699.
PCT International Preliminary Report on Patentability dated Feb. 27, 2014 in corresponding International Application No. PCT/JP2012/070096.
International Search Report dated Sep. 18, 2012, in corresponding International Application No. PCT/JP2012/070096.
Japanese Office Action dated Dec. 2, 2014 in corresponding Japanese Patent Application No. 2011-178834.
U.S. Office Action dated Jun. 24, 2015 from copending U.S. Appl. No. 14/237,465.
U.S. Office Action dated Oct. 19, 2015 from copending U.S. Appl. No. 14/237,465.
U.S. Notice of Allowance dated Apr. 11, 2016 from copending U.S. Appl. No. 14/237,465.
U.S. Appl. No. 14/237,465, filed Feb. 6, 2014, Makoto Muramatsu, NTN Corporation.
Chinese decision of Rejection dated Nov. 1, 2016 from Chinese Patent Application No. 201280039757.0, 7 pages.

Fig. 11A
LOCKED POSITION

Fig. 11B
UNLOCKED POSITION

ELECTRIC BRAKE DEVICE

CROSS-REFERENCE TO RELATED APPLICATIONS

This application is continuation of U.S. application Ser. No. 14/237,465, filed on Feb. 6, 2014, which is a U.S. national stage application of PCT/JP2012/070096 filed Aug. 7, 2012, and claims foreign priority benefit of Japanese Application No. 2011-178834 filed Aug. 18, 2011, and Japanese Application No. 2011-188699 filed Aug. 31, 2011, in the Japanese Intellectual Property Office, the entire disclosures of which are incorporated herein by reference.

BACKGROUND

1. Field

The present invention relates to an electric brake device of a type equipped with a parking lock mechanism and, more particularly, to the technology of preventing the electric brake device from being frozen with no need of releasing a braking force.

2. Description of the Related Art

In general, a vehicle is inhibited from moving with the utilization of a parking brake that is mechanically independent from a so-called foot operated brake (also called "service brake"). However, particularly during the winter season and at cold districts, it often occurs that the parking brake may be frozen enough to make it difficult to release. Accordingly, a suggestion has been made that at some cold district, if without the parking brake being used at the time of parking of a vehicle, an engagement member in an automatic transmission is engaged with a to-be-engaged member with, for example, the automatic transmission set to a parking range, the movement of the vehicle is simply prevented.

Also, another suggestion has been made that if at some cold district, in order to avoid a freezing of an electric parking brake while the vehicle is parked, a sensor for detecting the ambient temperature of the vehicle detects a temperature at which the freezing takes place, the electric parking brake can be released. In this connection, see, for example, Japanese Patent Publication No. 2005-082035.

According to the technique discussed above, the electric parking brake is released and thus the movement of the vehicle is inhibited by the parking lock mechanism for the automatic transmission. However, the parking lock mechanism for the automatic transmission is an auxiliary mechanism and a burden tends to be imposed on the automatic transmission to such an extent as to trigger a problem on the state of engagement between the engagement member and the to-be-engaged member in the automatic transmission. Once this problem occurs, it may often occur that the vehicle will undesirably move.

SUMMARY

In view of the foregoing, the present invention has for its primary object to provide an electric brake device, in which a freezing that takes place while the vehicle is parked can be assuredly avoided with a simplified mechanism, without releasing a braking force.

The electric brake device of the present invention includes an electric motor, a braking force application mechanism configured to apply a braking force on a vehicle wheel in dependence on the output of the electric motor, and a lock mechanism capable of assuming one of a locked condition, in which the braking force applied by the braking force application mechanism is prevented from being relieved, and an unlocked condition, in which the braking force is permitted to be relieved. The electric brake device of the type referred to above also includes a temperature sensor configured to measure an ambient temperature of a vehicle, in which the electric brake device is provided, or a temperature of such electric brake device, and a freezing preventive power supply unit configured to initiate supply of an electric power to the electric motor or a drive source of the lock mechanism in the event that while the braking force application mechanism applies the braking force and the lock mechanism is held in the locked condition, the temperature sensor detects a preset temperature of the electric brake device immediately before freezing. It is to be noted that the wording "preset temperature of the electric brake device immediately before freezing" referred to above and hereinafter is to be understood as meaning a temperature slightly higher than the temperature at which the electric brake will be frozen and which is preset beforehand.

According to the foregoing configuration, during the driving of the vehicle the lock mechanism is held in the unlocked condition and the braking force application mechanism applies the braking force on the vehicle wheel when the electric motor is driven. In a condition with the braking force application mechanism applying the braking force on the vehicle wheel, the lock mechanism is switched to the locked condition, and thus, the movement of the vehicle is inhibited during the parking. With the lock mechanism held in the locked condition, the braking force is maintained even though the electric motor is halted. If during the parking the freezing occurs in the lock mechanism or others, release from the locked condition cannot be accomplished. However, with the electric brake device so constructed as hereinabove described, the temperature sensor measures the ambient temperature of the vehicle or the temperature of the electric brake device during the parking of the vehicle. While the braking force application mechanism applies the braking force and, at the same time, the lock mechanism is in the locked condition, the freezing preventive power supply unit starts supplying the electric power to the electric motor or the drive source of the lock mechanism when the temperature sensor detects the preset temperature of the electric brake device immediately before the freezing. For the drive source referred to above, a linear solenoid, for example, is employed. By this supply of the electric power, the motor itself or the drive source itself is heated with the motor coil of the electric motor or the coil of the linear solenoid, which serves as the heat source, resulting in an increase of the temperature of the electric brake device. Accordingly, during the parking, the freezing of the lock mechanism and others of the electric brake device can be prevented and the lock release can be accomplished properly if required such as at the time of start of the vehicle. Thus, the vehicle can be started with no delay. As discussed above, since the motor coil or the drive source of the lock mechanism is used as the heat source, no extra heat source dedicated for the freezing prevention is needed and the freezing prevention can be accomplished with a simple structure.

In a preferred embodiment, the lock mechanism may include a lock member capable of assuming one of a locked position, in which the lock mechanism assumes the locked condition, and an unlocked position, in which the lock mechanism is held in the unlocked condition, and an actuation mechanism configured to change the position of the lock member. The actuation mechanism includes a bias unit configured to bias the lock member to assume the unlocked position and the drive source. The actuation mechanism is operable to actuate the lock member against a biasing force of the bias unit so that the lock member assumes the locked position.

According to the foregoing configuration, during the driving of the vehicle the lock member of the lock mechanism is held at the unlocked position by a biasing force of the bias unit and when the electric motor is driven, the braking force application mechanism applies the braking force on the vehicle. In a condition in which the braking force application mechanism applies the braking force on the vehicle, when the vehicle is parked, the lock member is actuated to the locked position by means of the drive source against the biasing force of the bias unit.

Thereafter, even though the ignition in the vehicle is switched off, for example, at the time the driver leaves from the vehicle, and the supply of the electric power to the drive source is therefore ceased, the lock member is engaged with some other member and is hence held in the locked position by the action of a frictional force with such some other member and, accordingly, the lock member is held in the locked position without the locked condition of the lock mechanism being released. In other words, the lock mechanism once set in the locked condition remains in the locked condition even though the ignition switch is turned off. In view of this, the movement of the vehicle is inhibited. Since the lock mechanism is remained in the locked condition, even though the electric motor is then halted, the braking force is maintained. When during the parking, for example, the freezing occurs in the bias unit and others of the lock mechanism, the lock member becomes unable to be returned to the unlocked position only with the biasing force of the bias unit. In other words, no release of the locked position of the lock mechanism is accomplished. However, since in the configuration described above the bias unit and others of the lock mechanism are protected from being frozen, when the driver returning to the vehicle performs a parking brake release operation, the electric motor temporarily applies the braking force to allow the frictional force with some other member of the lock member to be released. Accordingly, the bias unit biases the lock member to allow the latter to assume the unlocked position and, hence, the lock mechanism is set in the unlocked condition.

As hereinabove described, since the temperature sensor measures the ambient temperature of the vehicle or the temperature of the electric brake device, during the parking the freezing of the lock mechanism and others of the electric brake device can be prevented. It is to be noted that, when the lock mechanism is held in the locked condition, that is, the lock member is held in the locked position, the lock member is retained in the locked position by the action with the frictional force with some other member and, even though the electric power is supplied to the drive source, the previously described locked condition will not be undesirably released.

In another preferred embodiment, the lock mechanism may include a lock member capable of assuming one of a locked position, in which the lock mechanism assumes the locked condition, and an unlocked position, in which the lock mechanism is held in the unlocked condition, and an actuation mechanism configured to change the position of the lock member. The actuation mechanism in turn includes the drive source including a drive source of a double acting type configured to drive the lock member so that the lock member can assume the unlocked position or the locked position. The freezing preventive power supply unit, when initiating supply of the electric power to the drive source, supplies the electric power to the drive source so that the lock member is maintained in the locked position.

According to the foregoing configuration, during the parking of the vehicle the braking force application mechanism applies the braking force and, at the same time, the lock mechanism is in the locked condition and when the temperature sensor detects the temperature immediately before the freezing, the freezing preventive power supply nit initiates the supply of the electric power to the double acting drive source so that the lock member can be maintained at the locked position. Accordingly, with the drive source itself being heated, the temperature of the electric brake device is elevated. In this way, during the parking, the freezing of the lock mechanism and others of the electric brake device can be assuredly avoided and the lock release can be accomplished properly when required such as at the time of start of the vehicle.

Where the freezing preventive power supply unit initiates the supply of the electric power to the electric motor, the freezing preventive power supply unit may supply the electric power to the electric motor to improve the braking force brought about by the braking force application mechanism. In this case, since although a rotor of the electric motor is likely to rotate, the braking force application mechanism applies the braking force and, hence, a pressing reactive force is generated, the rotation of the rotor of the electric motor is restricted.

Alternatively, where the freezing preventive power supply unit initiates the supply of the electric power to the electric motor, the freezing preventive power supply unit may supply the electric power to the electric motor to thereby reduce the braking force brought about by the braking force application mechanism. In this case, since the lock mechanism is in the locked condition, the rotation of the rotor of the electric motor is restricted. Accordingly, the braking force brought about by the braking force application mechanism will not in actuality decrease.

The freezing preventive power supply unit, after the temperature sensor has detected the preset temperature immediately before the freezing and then the freezing preventive power supply unit initiates the supply of the electric power to the electric motor or the drive source of the lock mechanism, may repeat alternate supply of and interruption of the supply of the electric power to the electric motor or the drive source of the lock mechanism at intervals of a predetermined time. Subsequent to the initiation of the supply of the electric power to the electric motor or the drive source, the temperature detected by the temperature sensor has a tendency to increase with passage of time. If even thereafter the supply of the electric power to the electric motor or the drive source is continued, the freezing of the electric brake device can be assuredly prevented without the temperature exhibiting a tendency to decrease, but in such case the battery is burdened. Also, if the motor itself or the drive source itself attains a high temperature as a result of the supply of the electric power to the electric motor or the drive source for a relatively long time, there is a tendency that decrease of the temperature, even though the supply of the electric power to the electric motor or the drive source is temporarily interrupted, becomes difficult to achieve.

In contrast thereto, according to the foregoing configuration, the freezing preventive power supply unit cyclically supplies and interrupts the supply of the electric power to the electric motor or the drive source at interval of a constant time and, accordingly while the burden on the battery is reduced, as compared with that exhibited when the electric power is continuously supplied to the electric motor or the drive source, and, at the same time, the freezing of the electric brake device can be avoided. It is to be noted that although it may be contemplated that the electric power is continuously supplied to the electric motor or the drive source and when the tendency of the predetermined temperature rise is exhibited, the electric current to be supplied to the electric motor or the drive source is reduced. However, if, for example, the difference in temperature is large between day and night while the time during which the vehicle is parked is long, cyclic repetition of the supply and interruption of the supply of the electric power to the electric motor or the drive source at intervals of the constant time, rather than the electric current control with the continued supply of the electric power, is effective to reduce the burden on the battery and the control can be accomplished simply.

The electric brake device may further include a speed reducer configured to reduce the speed of a rotation of the electric motor. The braking force application mechanism applies the braking force on the vehicle wheel after having converted a rotary motion, outputted from the speed reducer, into a linear motion.

The electric brake device may still further include a starting operation detection unit configured to detect an incipient event likely to occur prior to a starting operation of a vehicle. The freezing preventive power supply unit may supply the electric power to the electric motor or the drive source of the lock mechanism when the starting operation detection unit detects the incipient event prior to the starting operation of the vehicle in the event that, while the braking force application mechanism applies the braking force and the lock mechanism is in the locked condition, the temperature sensor detects the preset temperature. While the prevention of the freezing of the electric brake device during the parking is carried out by means of the supply of the electric power to the electric motor or the drive source of the lock mechanism in response to the detection of the temperature, if the preset temperature (the preset temperature immediately before the freezing) is too high, consumption of the electric power stored in the battery become considerable. It may happen that if in order to suppress the power consumption the preset temperature is lowered, the freezing may occur to a certain extent. In this case, if the supply of the electric power to the electric motor or the drive source of the lock mechanism is carried out when the event likely to occur prior to the starting operation of the vehicle as hereinbefore discussed is detected, the freezing of the electric brake device can be early resolved before the vehicle starts to move and, therefore, the vehicle can be started with no delay.

The event referred to above, which is detected by the starting operation detection unit may be an opening of a door of the vehicle.

Also, the event referred to above, which is detected by the starting operation detection unit may be a release of a door lock of the vehicle.

Further, the event referred to above, which is detected by the starting operation detection unit may be when an ignition in the vehicle is switched on.

Still further, the event referred to above, which is detected by the starting operation detection unit may be a driver's seating on a driver's seat in the vehicle. The starting operation detection unit includes a sensor to detect the seating made by a driver onto the driver's seat.

Yet further, the event referred to above, which is detected by the starting operation detection unit may be a pedaling to apply the braking force on the vehicle wheel.

Yet further, the event referred to above, which is detected by the starting operation detection unit may be when an engine of the vehicle is started at a place remote from the vehicle.

The present invention also provides an automotive vehicle equipped with the electric brake device of a type discussed above.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

An electric brake device designed in accordance with a first embodiment of the present invention will be described in detail with particular reference to FIGS. 1 to 5. The electric brake device B according to this embodiment concurrently serves as a service brake, which may be applied when a vehicle, which is an automotive vehicle, runs, and a parking brake, which may be applied when the vehicle is parked. When a lock mechanism as will be detailed later is held in an unlocked condition, this electric brake device can be used as the service brake, but when it is held in a locked condition, such electric brake device can be used as the parking brake.

Figure 1:
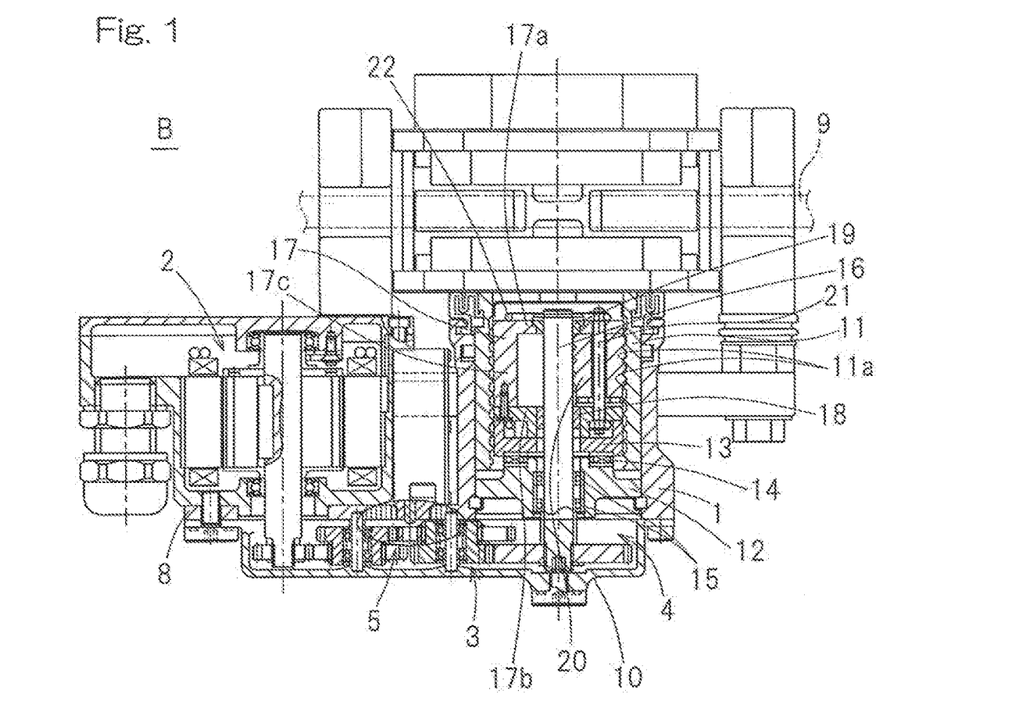
FIG. 1 is a sectional view of an electric brake device designed in accordance with first to fifth preferred embodiments of the present invention.
Figure 5:
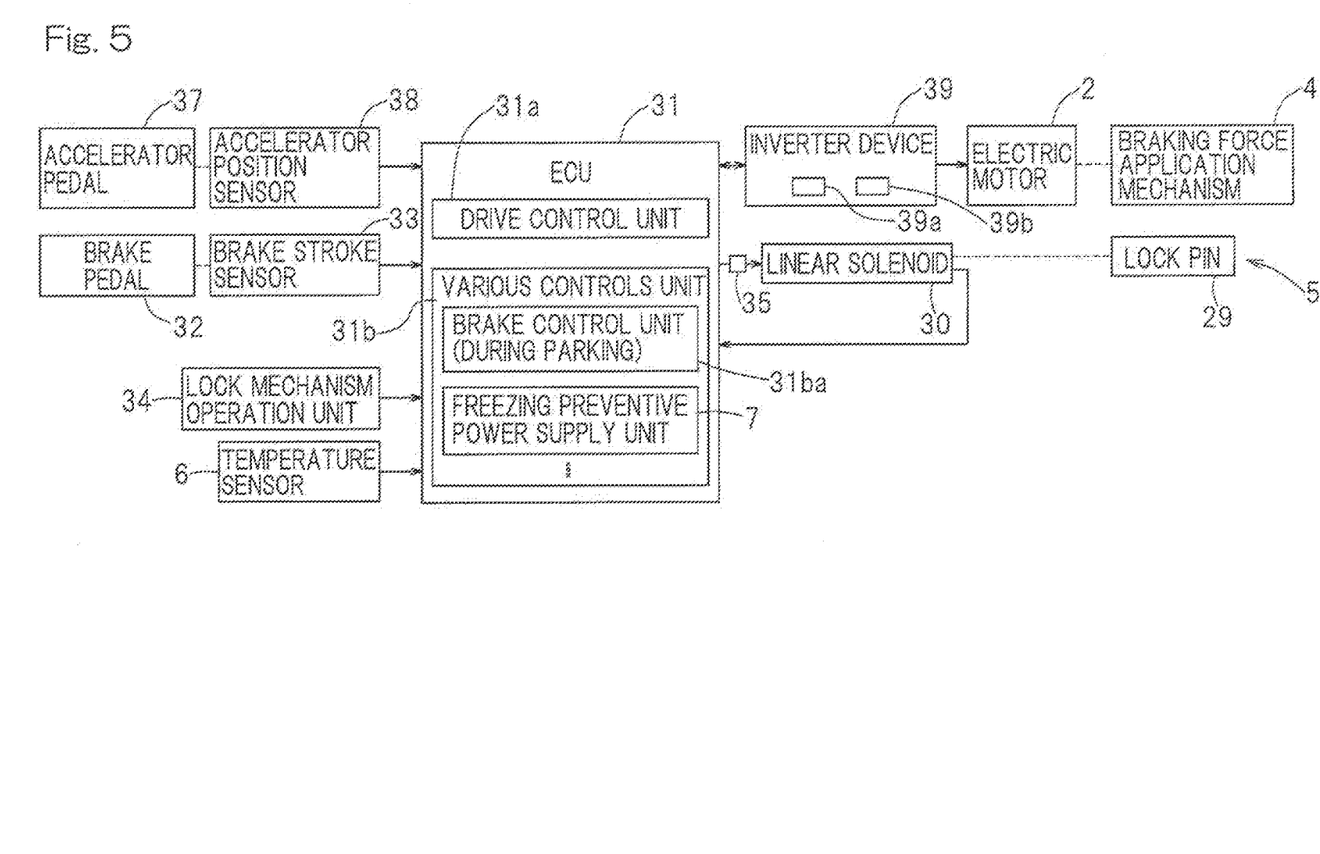
FIG. 5 is a block diagram showing a control system employed in the electric brake device shown in FIG. 1.

The electric brake device B referred to above includes, in addition to the lock mechanism identified by 5, a housing 1, an electric motor 2, a speed reducer 3 for decelerating the rotation of the electric motor 2, a braking force application mechanism 4, a temperature sensor 6 (shown in FIG. 5), and a freeze preventive power supply unit 7 (shown in FIG. 5). The housing 1 has an open end that is provided with a radially outwardly extending base plate 8. The electric motor 2 is supported by this base plate 8. The braking force application mechanism 4 is accommodated within the housing 1 and is operable to apply a braking force on a vehicle wheel, for example, a brake disc 9 in the instance as shown through an output of the electric motor 2. The open end of the housing 1 and an outer surface of the base plate 8 are covered by a covering 10.

The braking force application mechanism 4 will now be described in detail.

The braking force application mechanism 4 is a so-called linear motion actuator operable to convert a rotary motion, which is outputted from the speed reducer 3, into a linear motion and then to apply a braking force on the vehicle wheel. This braking force application mechanism 4 includes a cylindrical slide member 11, a bearing member 12, an annular thrust plate 13, a thrust bearing 14, rolling bearings 15 and 15, a rotary shaft 16, a carrier 17, and first and second slide bearings 18 and 19. The cylindrical slide member 11 referred to above is movably supported by an inner peripheral surface of the housing 1 for non-rotation but axial movement. The slide member 11 has an inner peripheral surface formed with a helical projection 11a protruding a predetermined distance in a direction radially inwardly and formed helically. This helical projection 11a is engaged with a plurality of planetary rollers as will be described later.

The bearing member 12 referred to above is provided in an axial end of the slide member 11 within the housing 1. This bearing member 12 is made up of a radially outwardly extending flange and a boss. The rolling bearings 15 and 15 referred to above are mounted inside the boss, and the rotary shaft 16 referred to above is inserted in inner diametric surfaces of inner rings of those bearings 15 and 15. Accordingly, the rotary shaft 16 is rotatably supported by the bearing member 12 through the bearings 15 and 15.

The carrier 17 referred to above is provided in an inner periphery of the slide member 11 for rotation about the rotary shaft 16. This carrier 17 is made up of a first disc 17a and a second disc 17b, which are disposed in an axially face to face relation with each other. The second disc 17b adjacent the bearing member 12 may be referred to as an inner disc 17b whereas the first disc 17a remote from the bearing assembly 12 may be referred to as an outer disc 17a. One of two principal surfaces of the first disc 17a, which confronts the second disc 17b, is provided with a spacing adjusting member 17c so as to protrude axially from an outer peripheral edge portion of such one of the principal surfaces. This spacing adjusting member 17c is provided in a plural number in spaced relation to each other in a circumferential direction so that the spacing between the planetary rollers 20 may be adjusted from each other. By those spacing adjusting members 17c, the first and second discs 17a and 17b are provided integrally.

The second disc 17b is rotatably and axially movably supported by a first slide bearing 18 that is interposed between the disc 17b and the rotary shaft 16. The first disc 17a has a shaft insertion hole defined at a center portion thereof. Into this shaft insertion hole a second slide bearing 19 is inserted. The first disc 17a is rotatably supported by the rotary shaft 16 by means of the second slide bearing 19. The rotary shaft 16 has an end portion, on which a washer for receiving a thrust load is mounted, and is provided with a snap ring for constraining the washer from separating from the rotary shaft 16.

The carrier 17 referred to above is provided with a plurality of roller shafts 21, each of those roller shafts 21 being supported by the first and second discs 17a and 17b. In other words, the first and second discs 17a and 17b are each provided with a plurality of shaft insertion holes in the form of long holes, and each roller shaft 21 is radially movably supported with its opposite end portion inserted into respective shaft insertion holes in the first and second discs 17a and 17b. A resilient biasing ring 22 for biasing those roller shafts 21 in a radially inward direction envelops those roller shafts 21.

Each of the planetary rollers 20 is rotatably supported by the respective roller shafts 21 and is interposed between an outer peripheral surface of the rotary shaft 16 and an inner peripheral surface of the slide member 11. By the action of resilient biasing force exerted by the resilient biasing ring 22 which envelops the plurality of the roller shafts 21 as hereinabove described, the planetary rollers 20 are urged against an outer peripheral surface of the rotary shaft 16. The planetary rollers 20 held in contact with the outer peripheral surface of the rotary shaft 16 as described above undergo rotation under contact friction when the rotary shaft 16 rotates. Each of the planetary rollers 20 has its outer peripheral surface formed with spiral grooves engageable with the spiral projection 11a in the slide member 11.

A washer and a thrust bearing, both not shown, are interposed between the second disc 17b of the carrier 17 and an axial end of each of the planetary rollers 20. Within the housing 1, the annular thrust plate 13 and the thrust bearing 14 are provided between the second disc 17b and the bearing member 12.

The details of the speed reducer 3 will now be described in detail.

Figure 2:
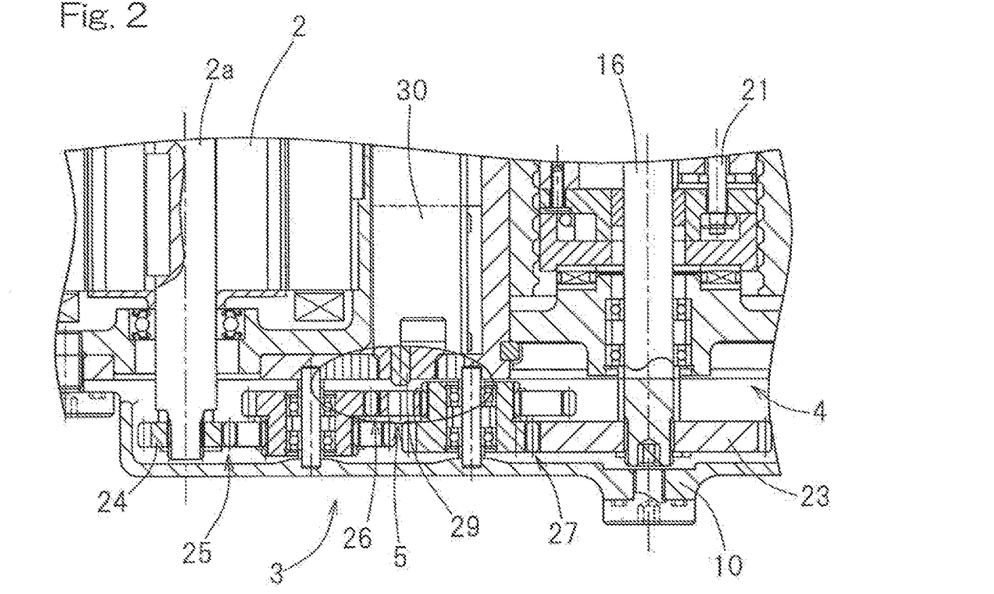
FIG. 2 is a sectional view showing, on an enlarged scale, a speed reducer employed in the electric brake device shown in FIG. 1.

As shown in FIG. 2, the speed reducer 3 is operable to reduce the speed of the rotation of the electric motor 2 and then to transmit the reduced speed of the electric motor 2 to an output gear 23 which is fixed on the rotary shaft 16. The speed reducer includes a plurality of gear trains. In the instance as shown, the speed reducer 3 is so designed that the rotation of an input gear 24 fitted to a rotor shaft 2a of the electric motor 2 can be, after the speed thereof is reduced sequentially by the first, second and third gear trains 25, 26 and 27, transmitted to the output gear 23 fixed to one end of the rotary shaft 16.

The lock mechanism 5 will now be described.

Figure 3:
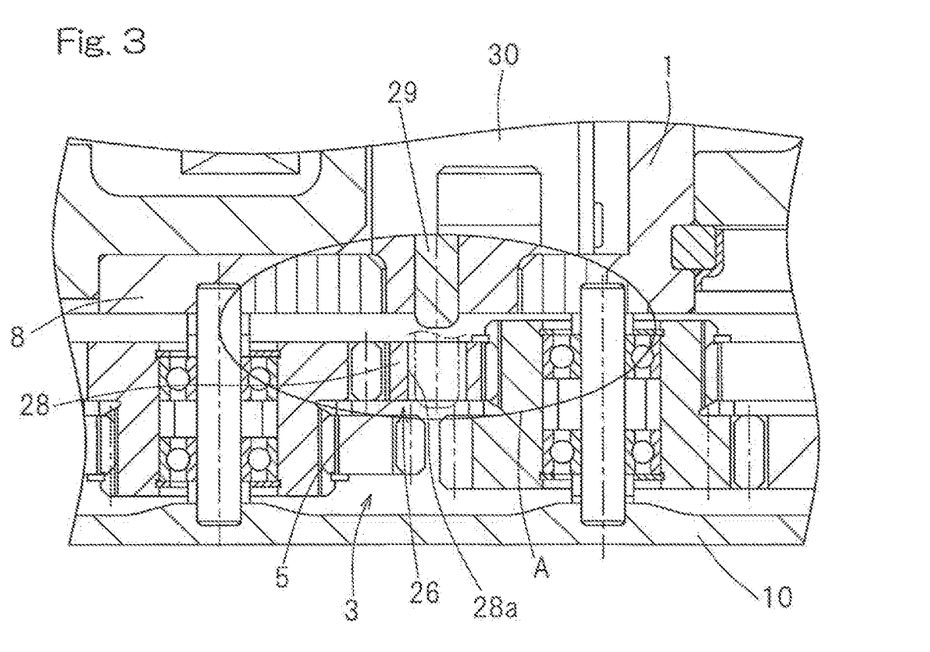
FIG. 3 is a sectional view showing, on an enlarged scale of a lock mechanism employed in the electric brake device shown in FIG. 1.
Figure 4A:
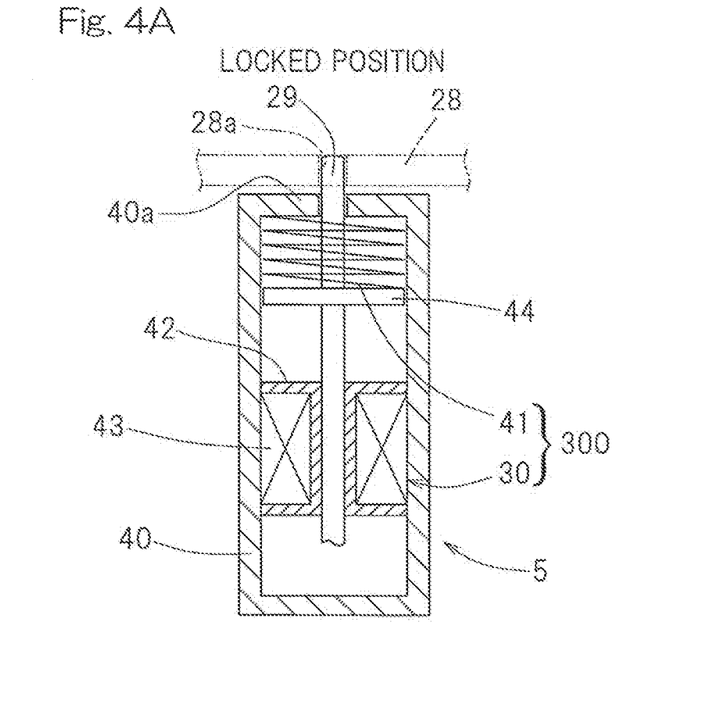
FIG. 4A is a diagram showing schematically the lock mechanism held in a locked condition in the electric brake device designed in accordance with the first to fourth preferred embodiments of the present invention.

As shown in FIG. 3, the lock mechanism 5 is so configured as to assume one of a locked condition, in which the braking force of the braking force application mechanism 4, shown in FIG. 2, is prevented from being relieved (i.e., being reduced), and an unlocked condition in which the braking force is allowed to be relieved. Within the oval A depicted in FIG. 3, the locked condition of the lock mechanism 5 is shown by the chain double-dashed line whereas the unlocked condition thereof is shown by the solid line. The speed reducer 3 referred to previously is provided with this lock mechanism 5. As shown in FIG. 4A, this lock mechanism 5 includes a casing 40, a lock pin 29 which serves as a lock member, and an actuation mechanism 300. The actuation mechanism 300 in turn includes a bias unit 41 for biasing the lock pin 29 towards the unlocked condition and a drive source in the form of a linear solenoid 30. The casing 40 is supported by the base plate 8, shown in FIG. 3, and the base plate 8 is formed with a pin hole through which advance and retraction of the lock pin 29 into and out are permitted.

The linear solenoid 30, made up of a coil bobbin 42 and a coil 43 wound around the coil bobbin 42, is disposed within the casing 40. The coil bobbin 42 has a hole defined therein and the lock pin 29 in the form of an iron core has its portion slidably accommodated within the hole of the coil bobbin 42. Within the casing 40, a flanged spring seat member 44 is fixed to a lengthwise intermediate portion of the lock pin 29. The casing 40 referred to above is provided with a base end portion 40a formed with a throughhole through which the lock pin 29 is selectively advanced and retracted. Also within the casing 40, the bias unit 41 in the form of a compression spring is interposed between the base end portion 40a and the spring seat member 44.

Figure 4B:
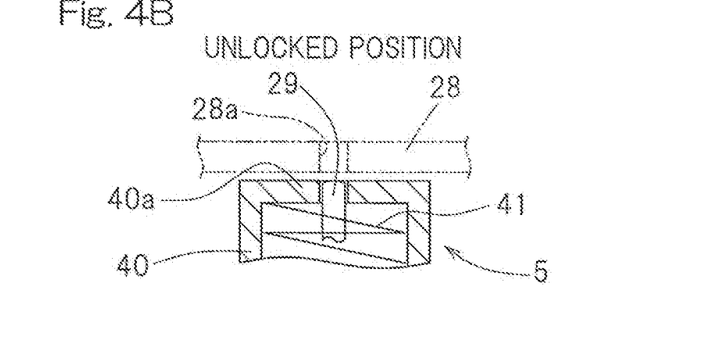
FIG. 4B is a diagram showing schematically the lock mechanism held in an unlocked condition.

The lock pin 29 referred to above is capable of assuming one of locked position (locked condition) as shown in FIG. 4A and an unlocked position (unlocked condition) as shown in FIG. 4B. In other words, as shown in FIG. 3, an intermediate gear 28 on an output side of the second gear train 26 has a plurality of engagement holes 28a defined therein and spaced a predetermined distance from each other in a circumferential direction. At one point on the pitch circle depicted by the engagement holes 28a, the lock pin 29 is provided so as to be selectively advanced or retracted by the linear solenoid 30 which serves as a pin driving actuator. The lock pin 29 in the unlocked position as shown in FIG. 4B is actuated to the locked position against the biasing force of the bias unit 41 as shown in FIG. 4A when an electric power is supplied to the linear solenoid 30. In other words, the lock pin 29 is moved to the locked position by the linear solenoid 30.

With the linear solenoid 30 actuating the lock pin 29 in the manner described above, the lock pin 29 is advanced to engage in the engagement hole 28a to thereby inhibit the rotation of the intermediate gear 28 and, accordingly, the lock mechanism 5 is held in a locked condition. However, when the supply of the electric power to the linear solenoid 30 is stopped, the spring seat member 44 is pressed by the biasing force of the bias unit 41 towards a bottom surface within the casing 40. In this way, the lock pin 29 is retracted within the casing 40 to disengage from the engagement hole 28a, allowing the intermediate gear 28 to rotate so that the lock mechanism 5 can be held in an unlocked condition. It is, however, to be noted that in the event that the power source for the electric motor is switched off, the braking force application mechanism and the speed reducer are operated so that the braking force is lowered by a pressing reactive force of the braking force and, therefore, a frictional force is developed between the lock pin and an inner diametric surface of the engagement hole, thereby inhibiting the lock mechanism from being switched over to the unlocked condition. When by a releasing operation of the parking brake the electric motor temporarily applies the braking force, the frictional force referred to above is released to allow the lock mechanism to be switched over to the unlocked condition.

Hereinafter, the temperature sensor 6, the freeze preventive power supply unit 7 and others will be discussed.

As shown in FIG. 5, the vehicle is provided with an electric control unit (ECU) 31, which is an electric control unit for controlling the vehicle in its entirety, and the temperature sensor 6 for detecting the ambient temperature of the vehicle. The temperature sensor 6 referred to above is fitted to, for example, a knuckle arm of the vehicle. The electric control unit 31 includes, mainly, a drive control unit 31a and a various controls unit 31b. The drive control unit 31a generates an acceleration/deceleration command from an acceleration signal, which is outputted from an accelerator position sensor 38 in dependence on the pedaling amount of an accelerator pedal 37, and a deceleration signal outputted from a brake stroke sensor 33 in response to the stroke of a brake pedal 32. In the instance as shown, the temperature sensor 6 is provided in the knuckle arm of the vehicle body, but it is not necessarily limited thereto. Where freezing takes place between the housing 1, shown in FIG. 1, and the speed reducer 3, also shown in FIG. 1, the temperature sensor 6 may be provided in, for example, the housing 1 (FIG. 1) of the electric brake device or the casing 40 (FIG. 4A) of the lock mechanism 5 (FIG. 4A) so that the temperature of the electric brake device can be measured. In those cases, the temperature of the electric brake device before being frozen can be accurately detected.

A lock mechanism operation unit 34 corresponds to an input section of operation of the parking brake by the vehicle driver. When the driver operates so as to actuate the parking brake, the lock mechanism operation unit 34 outputs an operation command to set the lock mechanism in the locked condition. On the other hand, when the driver operates so as to release the parking brake, the lock mechanism operation unit 34 outputs an operation command to set the lock mechanism in the unlocked condition.

The various controls unit 31b includes a brake control unit 31ba, the freezing preventive power supply unit 7 and other functions of controlling various accessory system (not shown). The brake control unit 31ba is configured to control the electric brake device, when the vehicle is parked, so that it may function as a parking brake. This brake control unit 31ba may drive the linear solenoid 30 through a drive circuit 35 in response to a speed reducing command, which is outputted from the brake stroke sensor 33, and an operating command from the lock mechanism operation unit 34.

An inverter device 39 is connected with the electric control unit 31 and includes a power circuitry 39a provided for each electric motor 2 corresponding to the respective drive wheel of the vehicle, and a motor controller 39b for controlling the power circuitry 39a. A common motor controller 39b may be provided for different power circuitries 39a. Alternatively, separate motor controllers 39b may be provided.

The motor controller 39b is comprised of a computer, a program executed by the computer and electronic circuits.

This motor controller 39b applies a current command to a PWM driver of the power circuitry 39a in accordance with a speed reducing commands applied from the drive control unit 31a and the brake control unit 31ba.

The freezing preventive power supply unit 7 referred to previously is operable to supply an electric power to the electric motor 2 when the temperature sensor 6 detects the temperature of the electric brake device immediately before the freezing while the braking force application mechanism 4 applies a braking force and, at the same time, the lock mechanism 5 is held in the locked condition. It is to be noted that when the vehicle is parked, the lock mechanism 5 is switched to the locked condition while the braking force application mechanism 4 applies the braking force. The predetermined temperature of the electric brake device immediately before the freezing can be arbitrarily chosen with the 0° C. temperature set as a reference. It is also to be noted that where the ambient temperature is to be measured by the temperature sensor 6, if the temperature inside the housing 1 of the electric brake device is maintained at a relatively higher temperature than the ambient temperature, the temperature of the electric brake device immediately before the freezing may be set at a low temperature as compared with the case in which the temperature of the electric brake device is measured.

Figure 6:
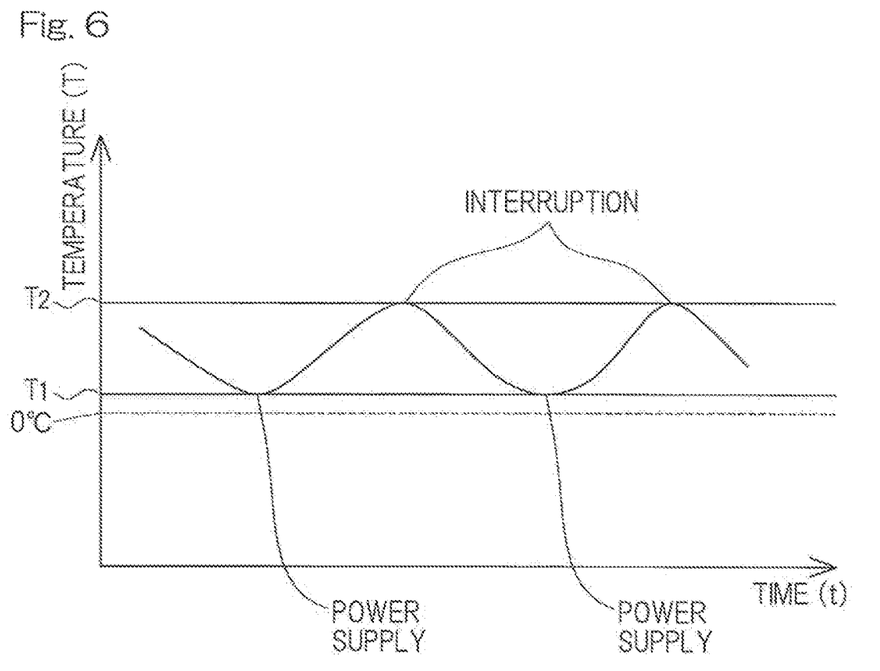
FIG. 6 is a chart showing the relationship between a preset temperature and time exhibited by a temperature sensor employed in the electric brake device designed in accordance with the first and second preferred embodiments of the present invention.

As hereinabove described, the freezing preventive power supply unit 7, when satisfying the three conditions, that is, (1) the braking force application mechanism 7 is in position to apply the braking force, (2) the lock mechanism 5 is held in the locked condition, and (3) the temperature sensor 6 is below a first preset temperature (a temperature immediately before the freezing that is set for the electric brake device), supplies an electric power to the electric motor 2 so that the rotor of the electric motor 2 can rotate in a direction required to improve the braking force brought about by the braking force application mechanism 4. In such case, although the rotor of the electric motor 2 is likely to rotate, since the braking force application mechanism 4 applies the braking force and thus a pressing reactive force is generated, the rotation of the rotor of the electric motor 2 is restricted. The freezing preventive power supply unit 7 may measure the ambient temperature through the temperature sensor 6 at all times (that is, at intervals of a short time). With the electric power supplied to the electric motor 2, when the temperature sensor 6 detects a second preset temperature that is higher than the first preset temperature, the freezing preventive power supply unit 7 interrupts the supply of the electric power to the electric motor 2. The first and second preset times referred to above represent specified reference temperatures at the time of power supply and at the time of power interrupt, respectively. As shown in FIG. 6, they differ from each other and at the time of power supply and the power interruption a power supply time preset temperature T1 and a power interruption time preset temperature T2 are respectively referred to. The power supply time preset temperature (the first preset temperature) T1 and the power interrupt time preset (the second preset temperature) T2 are set by respective predetermined temperatures higher than 0° C. The power interrupt time preset temperature T2 is set to a value higher than the power supply time preset temperature T1.

Alternatively, the freezing preventive power supply unit 7, when satisfying the above described three conditions (1) to (3), may supply an electric power to the electric motor 2 so that the rotor of the electric motor 2 can rotate in a direction required to reduce the braking force brought about by the braking force application mechanism 4. In such case, since the lock mechanism 4 is in the locked condition, the rotation of the electric motor 2 is restricted. Accordingly, the braking force brought about by the braking force application mechanism 4 is not reduced actually.

According to the electric brake device of the configuration hereinabove described, since during the driving of the vehicle the lock pin 29 of the lock mechanism 5 shown in FIG. 4B is held in the unlocked position by the action of the biasing force of the bias unit 41, with the electric motor 2 driven the braking force application mechanism 4 shown in FIG. 5 applies the braking force on the vehicle wheel. At the time of parking, in a condition in which the braking force application mechanism 4 shown in FIG. 5 applies the braking force on the vehicle wheel, the lock pin 29 of the lock mechanism 5 shown in FIG. 4A is actuated to the locked condition against the biasing force of the bias unit 41 by means of the linear solenoid 30. Thereafter, an ignition of the vehicle is switched off, for example, at the time the driver leaves the vehicle. Since even when the supply of the electric power to the linear solenoid 30 ceases, the lock pin 29 is engaged in the engagement hole 28a and held in the locked position by the action of a frictional force with the engagement hole 28a, the lock pin 29 is not released from the locked position. Accordingly, the movement of the vehicle is inhibited. Even though, with the lock mechanism 5 held in the locked condition, the electric motor 2 shown in FIG. 5 is halted, the braking force is maintained.

If during the parking, freezing occurs in the bias unit 41, for example, of the lock mechanism 5, it will become impossible for the lock pin 29 to be returned to the unlocked position only by the action of the biasing force of the bias unit 41. In other words, the locked condition cannot be released. However, during the parking of the vehicle, the temperature sensor 6 shown in FIG. 5 measures the ambient temperature of the vehicle or the electric brake device. When satisfying the previously described conditions (1) to (3) during the parking of the vehicle, the freezing preventive power supply unit 7 initiates the supply of the electric power to the electric motor 2. As a result of the supply of the electric power to the electric motor 2, the motor itself is heated with the motor coil serving as a heat source and, therefore, the temperature of the electric brake device is elevated. Accordingly, while the vehicle is parked, the freezing of the lock mechanism 5 of the electric brake device is assuredly prevented and lock release subsequently takes place properly. Then, the vehicle is started with no delay. Since the motor coil is used as a heat source as described above, no extra heat source specifically dedicated for prevention of freezing is needed and the freezing prevention can be accomplished with a simplified structure.

The electric brake device designed according to a second preferred embodiment of the present invention will be described hereinafter. The structure of this electric brake device is identical with that designed according to the first embodiment of the present invention shown in and described with reference to FIGS. 1 to 5. However, the electric brake device according to the second embodiment differs from that according to the first embodiment in that while the braking force application mechanism 4 shown in FIG. 1 applies the braking force and the lock mechanism 5 is held in the locked condition, when the temperature sensor 6 shown in FIG. 5 detects the preset temperature of the electric brake device immediately before the freezing, the freezing preventive power supply unit 7 starts supplying the electric power to the linear solenoid 30 (shown in FIG. 4A), which serves as a drive source for a actuation mechanism of the lock mechanism 5, not to the electric motor 2.

The control of the freezing preventive power supply unit 7 shown in FIG. 5 is specifically such as described below.

As is the case with a electric brake device pertaining to the first embodiment of the present invention, the freezing preventive power supply unit 7, when satisfying the three conditions, that is, (1) the braking force application mechanism 4 is in position to apply the braking force, (2) the lock mechanism 5 is held in the locked condition, and (3) the temperature sensor 6 is below a first preset temperature (a temperature immediately before the freezing that is set for the electric brake device), supplies an electric power to the linear solenoid 30. The freezing preventive power supply unit 7 measures the ambient temperature at all times with the temperature sensor 6. With the electric power supplied to the linear solenoid 30, when the temperature sensor 6 detects the second preset temperature that is higher than the first preset temperature, the freezing preventive power supply unit 7 interrupts the supply of the electric power to the linear solenoid 30. Here, even if the supply of the electric power to the linear solenoid 30 of FIG. 4A is interrupted, the locked condition is never released because the lock pin 29 is held in the locked position by the effect of a frictional force developed with the engagement hole 28a as the lock pin 29 is engaged in the engagement hole 28a.

Also, as the electric power is supplied to the linear solenoid 30, the linear solenoid 30 itself is heated with the coil 43 of the linear solenoid 30 serving as the heat source and the temperature of the electric brake device is consequently elevated. Accordingly, it is possible to assuredly avoid the freezing of the lock mechanism 5 and others of the electric brake device during the parking and, therefore, the lock release can be accurately performed. In view of this, the vehicle can be started with no delay. Since the linear solenoid 30 of the electric brake device is used as the heat source as discussed above, there is no need to employ an extra heat source dedicated for the freezing prevention and the freezing prevention can be accomplished with a simplified structure. It is to be noted that while the lock mechanism 5 is held in the locked condition, the lock pin 29 has been retained in the locked position by the effect of the frictional force with the engagement hole 28a of any one of the intermediate gears 28 and, therefore, even though the linear solenoid 30 is supplied with the electric power, there is no possibility that the locked condition may be undesirably released.

Figure 7:
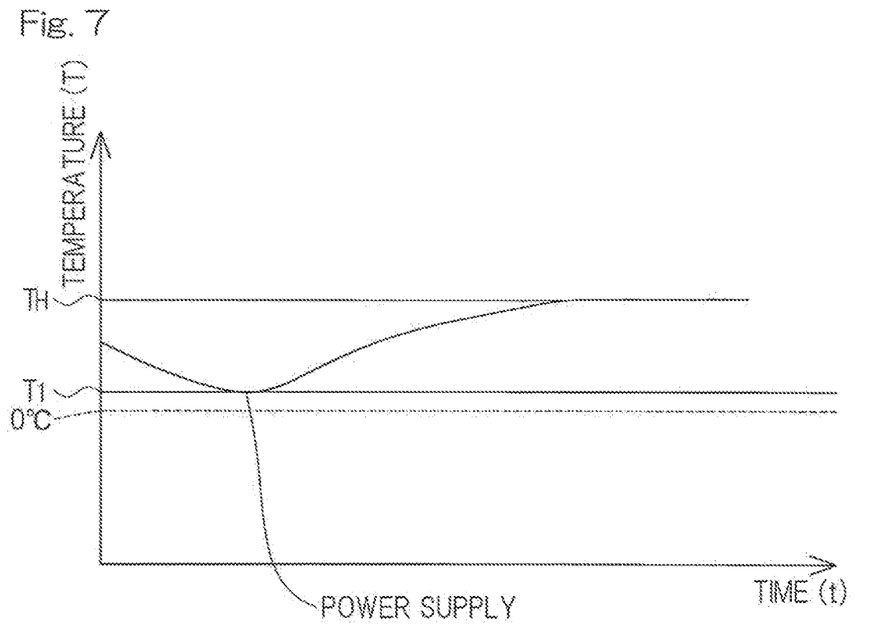
FIG. 7 is a chart showing the relationship between a preset temperature and time exhibited by a temperature sensor employed in the electric brake device designed in accordance with the third preferred embodiment of the present invention.

The electric brake device designed according to a third preferred embodiment of the present invention will now be described. The structure of this electric brake device is identical with that designed according to any one of the first and second embodiments of the present invention shown in and described with reference to FIGS. 1 to 5. The power supply for freezing preventive purpose may be carried out either to the electric motor such as in the electric brake device designed according to the first embodiment of the present invention or to the linear solenoid such as in the electric brake device designed according to the second embodiment of the present invention. However, the electric brake device according to the third embodiment differs to any one of the electric brake devices according to the first and second embodiments in respect of a method of supplying the electric power to the electric motor 2 (shown in FIG. 1) or the linear solenoid 30 (shown in FIG. 4A). In this third embodiment of the present invention, as shown in FIG. 7, control may be made so that after during the parking of the vehicle the electric power supply has been initiated to the electric motor 2 (shown in FIG. 1) or the linear solenoid 30 (shown in FIG. 4A) at a power supply time preset temperature T1, and at the time the temperature sensor 6 (shown in FIG. 5) detects a preset temperature TH which is higher than the temperature T1, the electric current supplied to the electric motor 2 (shown in FIG. 1) or the linear solenoid 30 (shown in FIG. 4A) may be reduced. In this case, rather than the supply of a constant electric current to the electric motor 2 (shown in FIG. 1) or the linear solenoid 30 (shown in FIG. 4A), the burden of a battery mounted on the vehicle can be reduced.

Figure 8:
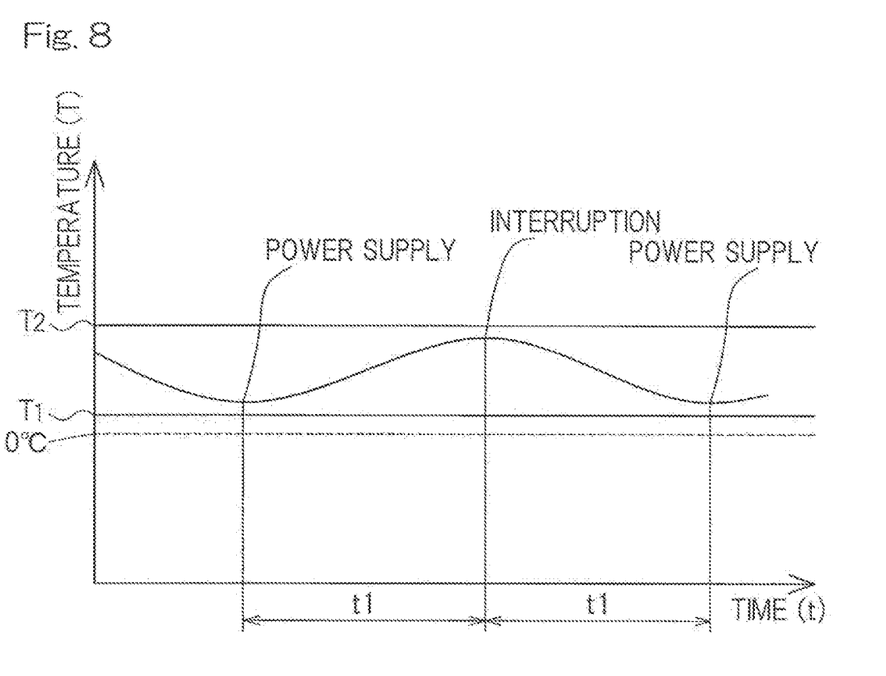
FIG. 8 is a chart showing the relationship between a preset temperature and time exhibited by a temperature sensor employed in the electric brake device designed in accordance with the fourth preferred embodiment of the present invention.

In the following description, the electric brake device designed according to a fourth preferred embodiment of the present invention is described. Even the structure of the electric brake device is identical with that designed according to any one of the previously described first to third embodiments of the present invention. However, the electric brake device according to the fourth embodiment differs from the electric brake device designed according to any one of the first to third embodiments of the present invention in respect of the method of supplying the electric power to the electric motor 2, shown in FIG. 1, or the linear solenoid 30 shown in FIG. 4A. In this fourth embodiment, as shown in FIG. 8, the freezing preventive power supply unit 7 shown in FIG. 5 may be of a type capable of repeatedly alternately supplying and interrupting the supply of the electric power to the electric motor 2, shown in FIG. 1, or the linear solenoid 30 shown in FIG. 4A at intervals of a predetermined time (at intervals of time t1) after the temperature sensor 6 shown in FIG. 6 has detected the first preset temperature and the supply of the electric power has subsequently been initiated. The temperature measured by the temperature sensor 6, shown in FIG. 5, after the supply of the electric power to the electric motor 2, shown in FIG. 1, or to the linear solenoid 30 shown in FIG. 4A represents a tendency of, for example, a rise with passage of time. With the electric power supplied thereafter to the electric motor 2, shown in FIG. 1, or the linear solenoid 30 shown in FIG. 4A, the freezing of the electric brake device can be assuredly avoided without showing a tendency of decrease of the temperature, but the continued supply of the electric power results in burdening the battery. Also, if the electric power is supplied to the electric motor 2, shown in FIG. 1, or the linear solenoid 30 shown in FIG. 4A for a relatively long time and the motor itself or the drive source itself is heated to a high temperature, there is a tendency that decrease of the temperature becomes difficult even though the supply of the electric power to the electric motor 2, shown in FIG. 1, or the linear solenoid 30 shown in FIG. 4A is temporarily interrupted. In contrast thereto, the freezing preventive power supply unit 7 in the electric brake device according to this fourth embodiment alternately repeats the supply of the electric power to the electric motor 2, shown in FIG. 1, or the linear solenoid 30, shown in FIG. 4A, and the interruption thereof at intervals of a predetermined time and can, therefore, avoid the freezing of the electric brake device while the burden on the battery is reduced as compared with the continued supply of the electric power to the electric motor 2, shown in FIG. 1, or the linear solenoid shown in FIG. 4A. It is to be noted that in the case of the supply of the electric power to the electric motor shown in FIG. 1, the power generation efficiency increases if no electric power is supplied continuously. Where the vehicle is parked for a substantial length of time, for example, when the difference in temperature between the day and the night is large, the alternate repetition of supply and interruption of the supply of the electric power to the electric motor 2, shown in FIG. 1, or the linear solenoid, shown in FIG. 4A, at intervals of the predetermined time is effective to reduce the burden on the battery and can accomplish the control simply as compared with the control of the electric current while the electric power is continuously supplied.

Figure 9:
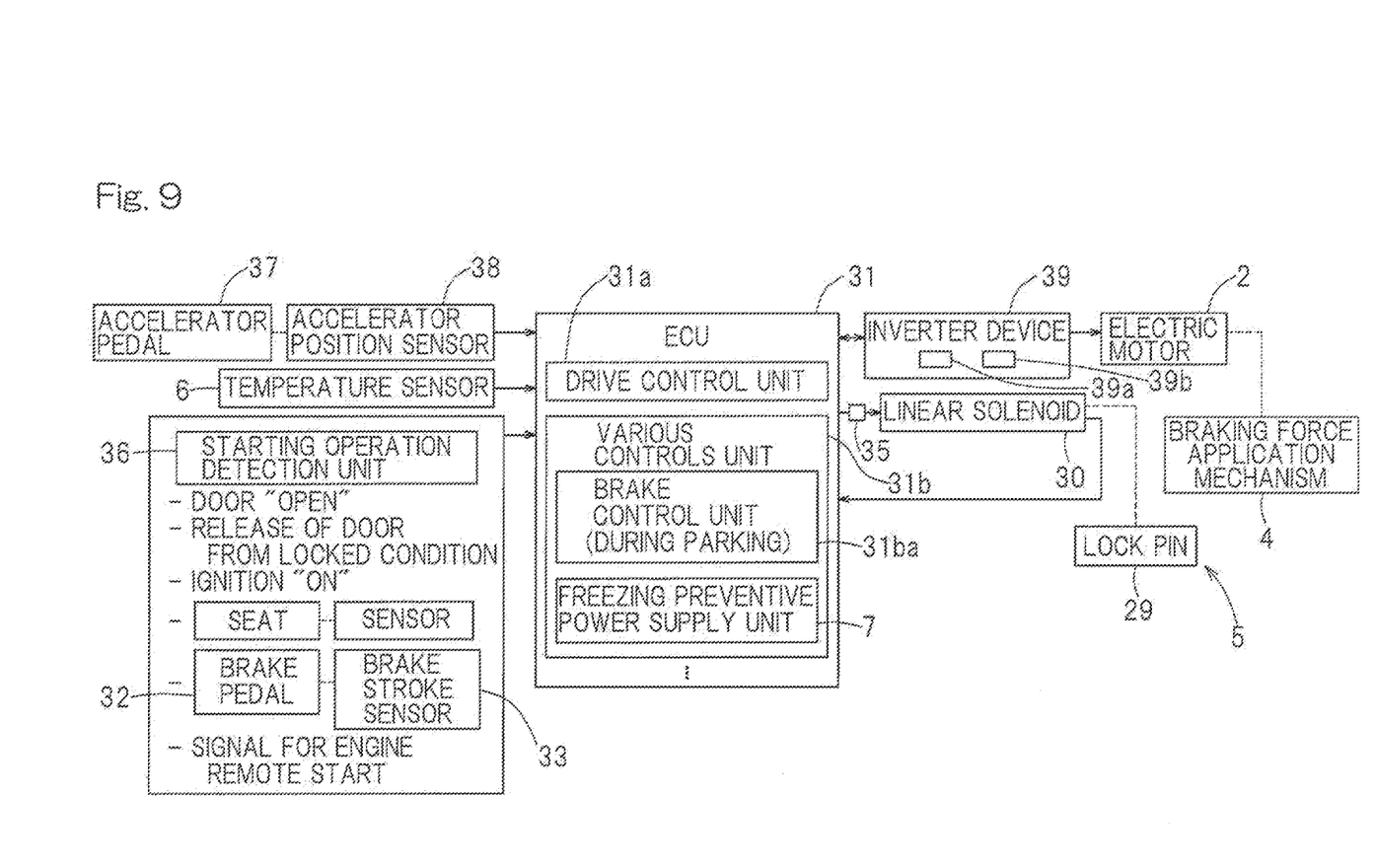
FIG. 9 is a block diagram showing another control system employed in the electric brake device shown in FIG. 1.

In any one of the previously described first to fourth embodiments of the present invention, as shown in FIG. 9, a starting operation detection unit 36 for detecting a signal descriptive of an operation to start the vehicle (that is, an incipient event that leads to the operation to start the vehicle) may be provided. The freeze preventive power supply unit 7 performs the supply of electric power to the electric motor 2 or the linear solenoid 30, when the signal descriptive of the operation to start the vehicle is detected by the starting operation detection unit 36, in the event that the temperature sensor 6 detects the preset temperature, while the braking force application mechanism 4 applies the braking force and the lock mechanism is in the locked condition.

The starting operation detection unit 36 may respond to the following detection signals:

Opening of a door of the vehicle is rendered to be the detection signal.

Release of the door lock of the vehicle is rendered to be the detection signal.

Switching on of the ignition in the vehicle is rendered to be the detection signal.

Detecting a driver's occupation of a driver's seat in the vehicle detected by a sensor is rendered to be the detection signal.

Pedaling to apply the braking force to the vehicle wheel is rendered to be the detection signal.

A signal to start an engine from a place remote from the vehicle is rendered to be the detection signal.

Even though a slight freezing occurs, as hereinabove described, if arrangement is made to effect the supply of the electric power to the electric motor 2 or the linear solenoid 30 when the detection signal descriptive of the operation to start the vehicle is detected, the freezing of the electric brake device can be resolved early and the vehicle can be started with no delay.

Figure 10:
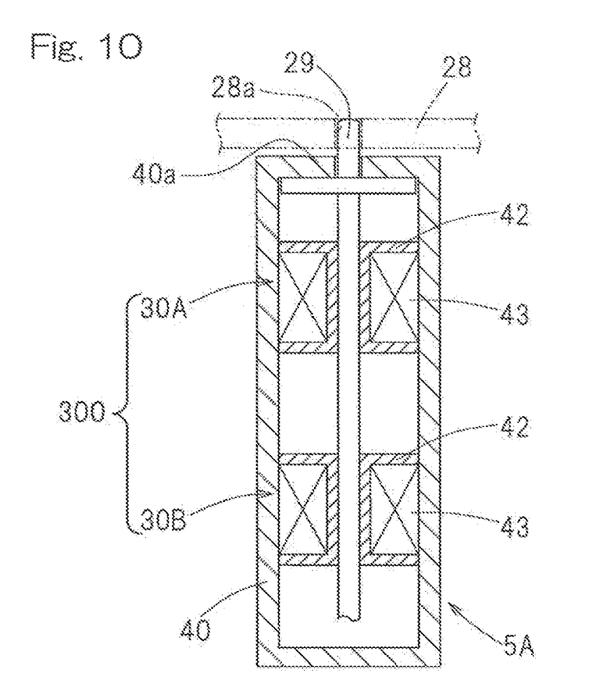
FIG. 10 is a schematic diagram showing the lock mechanism employed in the electric brake device designed in accordance with the fifth preferred embodiment of the present invention.

The electric brake device designed in accordance with a fifth preferred embodiment of the present invention is similar to that according to any one of the previously described first and second embodiments of the present invention, but differs therefrom in that in place of the lock mechanism 5, shown in FIG. 4A, in the electric brake device according to the first or second embodiment, a lock mechanism 5A shown in FIG. 10 is employed. The lock mechanism 5A shown in FIG. 10 includes a lock pin 29, which serves as a lock member, and a actuation mechanism 300 for actuating the lock pin 29 so as to selectively assume one of the locked position (the locked condition) and the unlocked position (the unlocked condition). The actuation mechanism 300 includes a drive source of a double acting type which is comprised of first and second linear solenoids 30A and 30B. When the electric power is supplied to the first linear solenoid 30A and the supply of the electric power to the second linear solenoid 30B is interrupted, the lock pin 29 is actuated to the locked position. On the other hand, when the supply of the electric power to the first linear solenoid 30A is interrupted and the electric power is supplied to the second linear solenoid 30B, the lock pin 29 is actuated to the unlocked position.

Even in this fifth embodiment, when during the parking the electric motor 2 shown in FIG. 1 is heated or the linear solenoid 30A is heated with the coil 43 of the linear solenoid 30A serving as the heat source, the temperature of the electric brake device is elevated. Accordingly, during the parking, freezing of the electric brake device including the lock mechanism 5A can be assuredly avoided and, subsequently, the release of the lock can be accomplished properly.

Figure 11A:
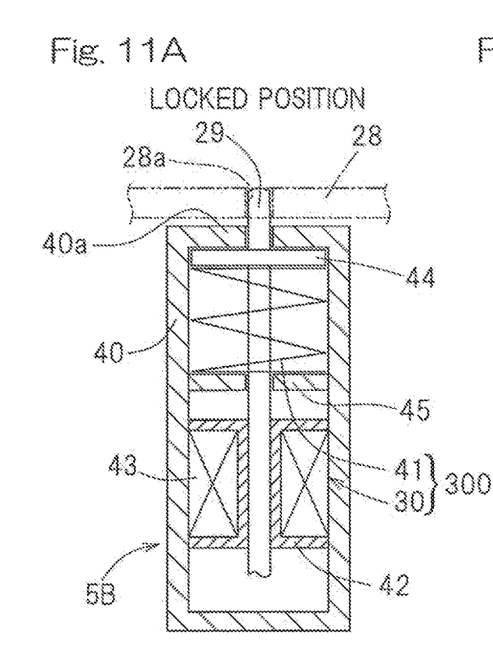
FIG. 11A is a schematic diagram showing the lock mechanism held in the locked condition, which lock mechanism is employed in the electric brake device designed in accordance with a sixth preferred embodiment of the present invention.
Figure 11B:
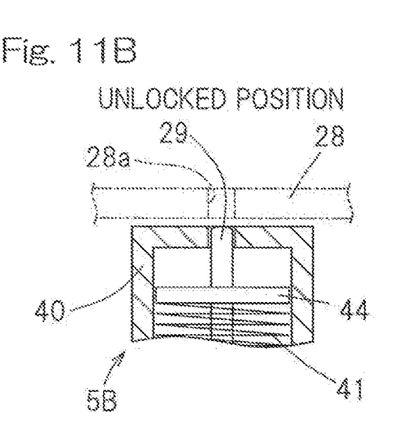
FIG. 11B is a schematic diagram showing the lock mechanism, shown in FIG. 11A, held in the unlocked condition.

The electric brake device designed in accordance with a sixth preferred embodiment of the present invention is similar to that according to any one of the previously described first and second embodiments of the present invention, but differs therefrom in that in place of the lock mechanism 5, shown in FIG. 4A, of the electric brake device according to the first or second embodiment, a lock mechanism 5B shown in FIGS. 11A and 11B is employed. The lock mechanism 5B includes a casing 40, a lock pin 29, which serves as a lock member, and a actuation mechanism 300. The actuation mechanism 300 in turn includes a bias unit 41 for biasing the lock pin 29 to the locked position as shown in FIG. 11A, and a release drive source for releasing the lock pin 29 to the unlocked position, as shown in FIG. 11B, against the biasing force of the bias unit 41. The release drive source is comprised of a linear solenoid 30. An inner flange 45 is fixed within a casing 40 and, within the casing 40, the bias unit 41 in the form of a compression coil spring interposed between the inner flange 45 and the spring seat member 44. In this case, during the parking the electric motor 2 is heated so that the temperature of the electric brake device is increased. By so doing, during the parking freezing of the electric brake device including the lock mechanism 5B can be assuredly avoided and, subsequently, the release of the lock can be accomplished properly.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS

2: Electric motor
3: Speed reducer
4: Braking force application mechanism
5, 5A, 5B: Lock mechanism
6: Temperature sensor
7: Freezing preventive power supply unit
29: Lock member
30: Drive source (Linear solenoid)
36: Starting operation detection unit
300: Actuation mechanism
B: Electric brake device

What is claimed is:
1. An electric brake device comprising:
an electric motor;
a braking force application mechanism configured to apply a braking force on a vehicle wheel in dependence on the output of the electric motor;
a lock mechanism configured to assume one of a locked condition, in which the braking force applied by the braking force application mechanism is prevented from being relieved, and an unlocked condition, in which the braking force is permitted to be relieved;

a temperature sensor configured to measure an ambient temperature of a vehicle, in which the electric brake device is provided, or a temperature of the electric brake device; and a freezing preventive power supply unit configured to initiate supply of an electric power to the electric motor or a drive source of the lock mechanism in the event that while the braking force application mechanism applies the braking force and the lock mechanism is held in the locked condition without releasing the braking force application mechanism, the temperature sensor detects a first preset temperature T1 of the electric brake device immediately before freezing, wherein the freezing preventive power supply unit interrupts the supply of the electric power to the electric motor or the drive source of the lock mechanism when the temperature detected by the temperature sensor exceeds a second preset temperature T2 that is higher than the first preset temperature T1, the exceeding being caused by the supply of the electric power to the electric motor or the drive source of the lock mechanism.

2. An electric brake device comprising:

an electric motor;

a braking force application mechanism configured to apply a braking force on a vehicle wheel in dependence on the output of the electric motor;

a lock mechanism configured to assume one of a locked condition, in which the braking force applied by the braking force application mechanism is prevented from being relieved, and an unlocked condition, in which the braking force is permitted to be relieved;

a temperature sensor configured to measure an ambient temperature of a vehicle, in which the electric brake device is provided, or a temperature of the electric brake device; and a freezing preventive power supply unit configured to initiate supply of an electric power to the electric motor or a drive source of the lock mechanism in the event that while the braking force application mechanism applies the braking force and the lock mechanism is held in the locked condition without releasing the braking force application mechanism, the temperature sensor detects a first preset temperature T1 of the electric brake device immediately before freezing, wherein the freezing preventive power supply unit reduces the supply of the electric power to the electric motor or the drive source of the lock mechanism when the temperature detected by the temperature sensor exceeds a third preset temperature TH that is higher than the first preset temperature T1, the exceeding being caused by the supply of the electric power to the electric motor or the drive source of the lock mechanism.

3. An electric brake device comprising:

an electric motor;

a braking force application mechanism configured to apply a braking force on a vehicle wheel in dependence on the output of the electric motor;

a lock mechanism configured to assume one of a locked condition, in which the braking force applied by the braking force application mechanism is prevented from being relieved and an unlocked condition, in which the braking force is permitted to be relieved;

a temperature sensor configured to measure an ambient temperature of a vehicle, in which the electric brake device is provided; and a freezing preventive unit configured to initiate the process to prevent freezing in the event that while the braking force application mechanism applies the braking force and the lock mechanism is held in the locked condition without releasing the braking force application mechanism, the temperature sensor detects a preset temperature of the electric brake device immediately before freezing, wherein when the ambient temperature measured by the temperature sensor is different from the temperature inside the housing of the electric brake device, the freezing preventive unit adjusts the preset temperature of the electric brake device immediately before freezing in accordance with the difference between the ambient temperature and the temperature inside the housing.

4. The electric brake device as claimed in claim 3, wherein when the temperature inside the housing of the electric brake device is maintained at a higher temperature than the ambient temperature, the freezing preventive unit sets the preset temperature of the electric brake device immediately before freezing at a lower temperature as compared with the case in which the temperature of the electric brake device is measured.

5. The electric brake device as claimed in claim 3, wherein the freezing preventive unit includes a freezing preventive power supply unit configured to initiate supply of an electric power to the electric motor or a drive source of the lock mechanism in the event that the temperature sensor detects the preset temperature.

6. The electric brake device as claimed in claim 4, wherein the freezing preventive unit includes a freezing preventive power supply unit configured to initiate supply of an electric power to the electric motor or a drive source of the lock mechanism in the event that the temperature sensor detects the preset temperature.

* * * * *